United States Patent [19]
Brinks et al.

[11] Patent Number: 6,029,497
[45] Date of Patent: Feb. 29, 2000

[54] PROCESS FOR DRIVING A SENSOR WITH OFFSET CONTROL

[75] Inventors: Gerald Brinks, Burgrieden; Manfred Weinacht, Dettingen/Teck, both of Germany

[73] Assignee: Temic Telefunken Microelectronic GmbH, Heilbronn, Germany

[21] Appl. No.: 09/033,069

[22] Filed: Mar. 2, 1998

[30] Foreign Application Priority Data

Feb. 28, 1997 [DE] Germany .............................. 197 08 115

[51] Int. Cl.$^7$ ...................................................... G01P 21/00
[52] U.S. Cl. ............................................... 73/1.38; 73/1.88
[58] Field of Search ................................... 73/1.38, 1.37, 73/1.39, 1.88, 497, 514.33; 702/87, 104

[56] References Cited

U.S. PATENT DOCUMENTS

| | | | |
|---|---|---|---|
| 5,396,439 | 3/1995 | Yamada | 73/514.33 |
| 5,604,684 | 2/1997 | Juntunen | 702/104 |
| 5,866,797 | 2/1999 | Swanson | 73/1.88 |

FOREIGN PATENT DOCUMENTS

| | | |
|---|---|---|
| 0758739A1 | 2/1997 | European Pat. Off. . |
| 2419914 | 11/1975 | Germany . |
| 3334603 | 4/1985 | Germany . |
| 3334603A1 | 4/1985 | Germany . |
| 57-096214 | 6/1982 | Japan . |

*Primary Examiner*—John E. Chapman
*Attorney, Agent, or Firm*—Venable; George H. Spencer; Norman N. Kunitz

[57] ABSTRACT

The invention concerns a process for driving a sensor with offset control. Such processes for driving are required, for example, to be used in acceleration transducers in motor vehicles for triggering, e.g., airbags or belt-tensioning devices. However, with existing processes the output nominal signal was repeatedly corrupted, e.g., by temperature-related interference signals, also known as the offset. In addition, existing systems are unreliable during turn-on. However, with the process according to this invention, the sign and the value of the difference between the output signal and a reference voltage is detected at a fixed or variable time pulse, with the sign changing the measuring voltage at the output and the difference value determining the clock frequency for this control process. Also, during turn-on a significantly increased clock frequency will be reduced in stages until the operating frequency is reached. The process according to this invention, therefore, allows reliable and low cost acceleration transducers to be realized.

9 Claims, 2 Drawing Sheets

PROCESS FOR DRIVING A SENSOR WITH OFFSET CONTROL

BACKGROUND OF THE INVENTION

The invention concerns a process for driving a sensor with offset control where the output signal of a drive circuit is compared to a reference voltage in a comparator, with the comparison being carried out of a fixed or variable operating frequency as disclosed in DE 33 34 603.

Such processes for driving are required, for example, to be used in acceleration transducers in motor vehicles for triggering, e.g. airbags or belt-tensioning devices. An acceleration transducer measures the deceleration of the vehicle, converts this measured value into an electric signal which is then amplified and passed on to a control device. This control device will generate a trigger signal if the deceleration characteristics identified correspond to those normally found when the vehicle crashes into an obstacle. The trigger device will cause ignition circuits to be triggered electrically which, by means of a chemical reaction, effect either the sudden inflation of the airbag or the sudden tightening of safety belts. Here, several types of acceleration transducers are differentiated, e.g.; piezoelectric and piezoresistive transducers. In the case of a piezoelectric transducer, a charge is generated which will be output as an electric current, whilst in the case of the piezoresistive transducers an electric voltage is generated micromechanically.

Such processes for driving acceleration transducers must be extremely reliable as there is the risk that the devices are triggered incorrectly due to the offset draft of the sensor signal across time and temperature. When cheap components are used, especially cheap acceleration transducers, this risk is particularly high.

DE 33 34 603 C2 discloses a process for a piezoelectric acceleration transducer complete with offset compensation where, in a comparator, the output current signal of the amplifier arrangement will be compared with a reference value. This comparison will be effected within a fixed or variable time period, and, depending on the output current signal of the comparator, the output current of a power source will be increased or decreased in line with a time pulse, and this output current will then be fed into an amplifier input.

During turn-on, in order to create defined starting conditions, the counter will be set to a predefined numeric value and the time pulse generator will be set to a higher frequency for a defined time period. This causes an accelerated offset control process to occur which balances more quickly any turn-on deviations.

However, the disadvantage of this process is that it can only be used to drive piezoelectric, that is, current-controlled, arrangements. A further disadvantage results from the fact that at that moment in which the turn-on process is terminated—that is, when the switchover from the higher frequency required for the turn-on process down to the significantly lower operating frequency is effected-, a crash event cannot be detected by means of this process, or that the device may be triggered incorrectly. Thus, this process does not afford reliable protection for the occupants of a motor vehicle across the entire time period.

SUMMARY OF THE INVENTION

The object of the invention is to provide a process which allows an offset drift at the sensor module output to be avoided even when simple and cheap sensors are used, such as voltage-generating, piezoresistive, micromechanical acceleration transducers, and which allows reliability to be ensured at any time, in particular during turn-on and in all operating conditions.

According to the invention, a process is provided which is based on the following, namely, that, in the drive system comprising a voltage-generating sensor, the sign and the value between the electrical voltage at the drive output and the reference voltage a with a fixed or variable operating frequency are measured, with the sign changing the voltage at the output of the control circuit and the value of the difference determining the operating frequency for this control system. Furthermore, during turn-on the frequency will increase significantly and then reduce in stages down to the operating frequency. Advantageous further features and applications of the invention are disclosed.

The advantages achieved by this invention consist in that the value for the lower operating frequency can be almost freely selected to be as low as required, thus combining the advantages of an AC coupling and a DC coupling, and that turn-on takes place very quickly and very reliably. With this process for driving a sensor, no external components are required as all functions can be integrated. Furthermore, an active offset adjustment at room temperature, or in excess of the permitted temperature range, will also no longer be necessary. With a high degree of precision, the output nominal voltage can be set to the value required and is independent of any changing input quantities (such as temperature) and offset errors caused by the sensor element or signal processing. Also, the preset sensitivity will not be affected by this process for driving a sensor. Another advantage of such a process is that sensor elements with a greater offset tolerance can be used; this leads to a greater yield in the production of such acceleration sensors and thus to a lower price.

Below the invention is to be further elucidated by means of embodiment examples in connection with the drawings.

BRIEF DESCRIPTION OF THE DRAWINGS

FIG. 3 shows the frequency mode during turn-on

DESCRIPTION OF THE PREFERRED EMBODIMENTS

Figure 1:
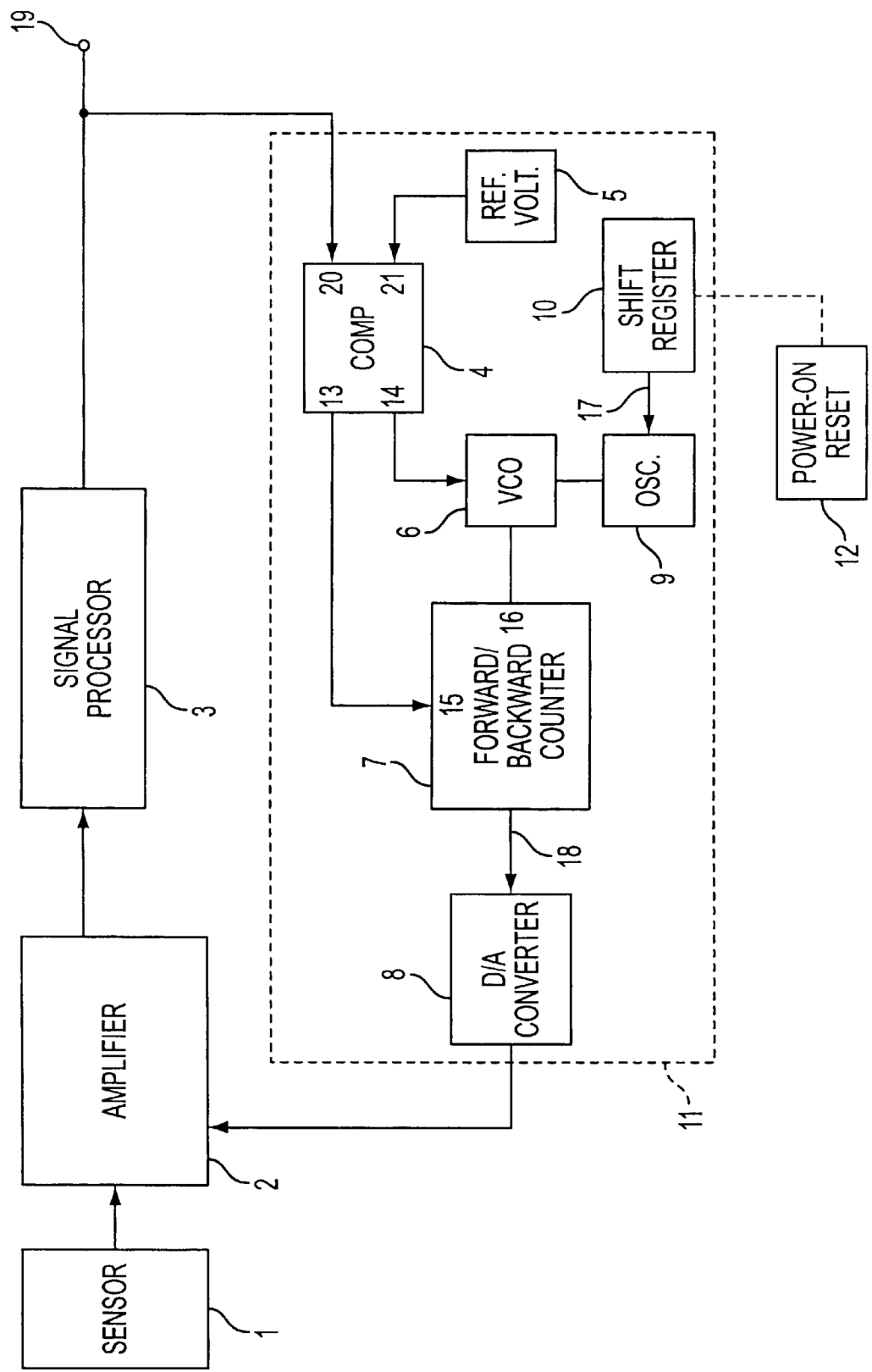
FIG. 1 is an illustration of the process according to his invention

In FIG. 1, sensor 1—for example, a micromechanical piezoresistive acceleration transducer—generates an electric voltage signal. This voltage signal is caused by an acceleration and will be designated below as an acceleration voltage. The value and temporal course of this acceleration voltage allows conclusions to be drawn with regard to the actual acceleration values that have occurred. This acceleration voltage will be amplified by means of an amplifier unit 2, and then—together with a reference voltage value for the ground signal, that is, the defined statistical zero point of the system—this amplified acceleration voltage will be conditioned by means of appropriate signal processing 3. The resulting voltage can be superposed by an offset voltage which arises due to manufacturing tolerances, environmental factors, operating conditions, and accidental factors. This is also the reason that the voltage at output 19 of the drive—which is composed of acceleration voltage, reference voltage ground and offset voltage—is falsified. In this embodiment example, the actual value 20 of this voltage will be taken off at output 19 and fed to a comparator 4. Here, the actual value (voltage at drive output) 20 will be compared with the nominal value (reference voltage) 21 from a reference voltage source 5. In comparator 4, when carrying out this comparison, on the one hand the sign of the difference 13 and the value of the difference 14 will be determined. Using the difference value 14, a voltage-controlled oscillator 6 will be operated. Depending on the value of the voltage difference between actual and nominal value, this voltage-controlled oscillator 6 will generate a clock frequency 16 for a forward/backward counter 7. The greater the difference between the actual value, and nominal value, the higher the frequency. The sign 13, which was determined by comparator 4, is fed directly to counter control input operation 15 of forward/backward counter 7. As a result, depending on the sign, its counter position will be increased by one, or decreased by one. The output of the forward/backward counter 7 is an n-bit parallel data line 18. This is directly connected to an n-bit digital/analog converter 8. This converts the signal from the forward/backward counter 7 into an analog voltage. This voltage is designated as a correction voltage. The correction voltage at output of the digital/analog converter 8 will now be used as a control variable. It is fed into amplifier 2.

The new voltage at output 19 of the drive circuit is now composed of the acceleration voltage, the system reference voltage on ground, the offset voltage, and the correction voltage, all taken together, with the correction voltage counteracting the offset voltage. This action will be repeated until the measuring voltage and reference voltage have the same value. It is advantageous if the time pulse frequency is selected such that it is as low as possible so that the arrangement—which acts as a high pass filter—has a bottom limit frequency (e.g., lower limit frequency=0.01 Hz), and this frequency is significantly below the utilization band of the respective arrangement. That is, the output of the drive is always controlled such that a fixed value is output. However, short-term signals stemming from an acceleration can freely get to the output. For airbag triggering, frequencies from 1 Hz–500 Hz are relevant.

Furthermore, this process for driving a sensor provides for an initialization (power on reset) in order to create as quickly and reliably as possible predefined initial conditions. During turn-on, power-on-reset 12 is operated, and thus the forward/backward counter 7, in the counter range will be set to a predetermined numeric value, usually a mean value, and the time pulse frequency 16 will be set to a higher frequency, e.g., 10 kHz, for a predefined period.

Figure 2:
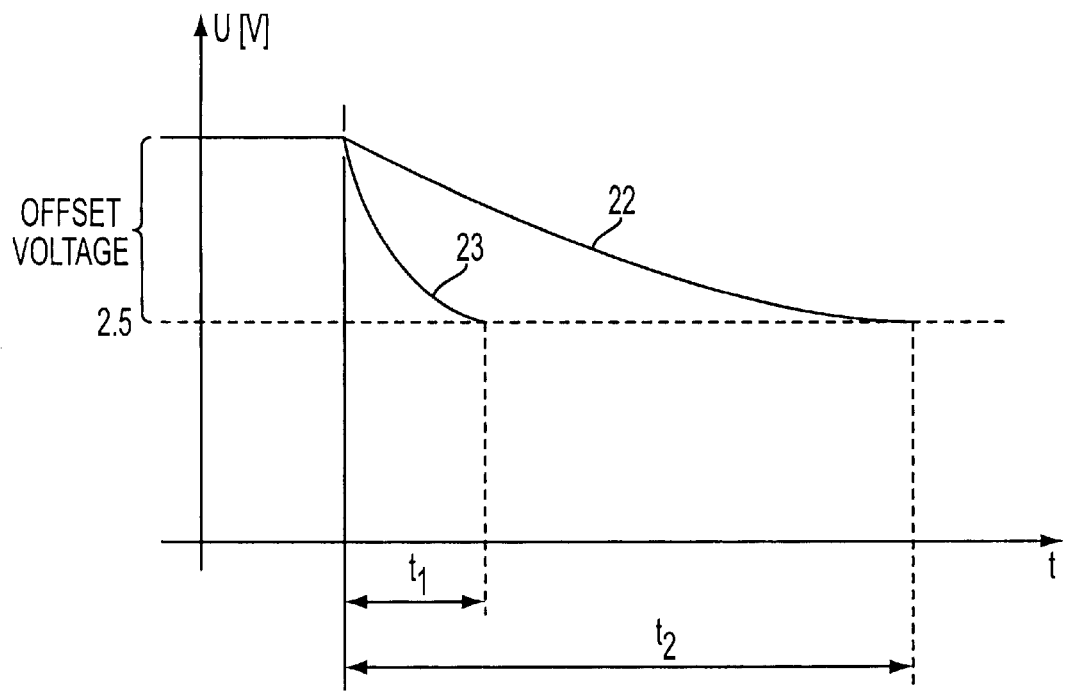
FIG. 2 shows a comparison of transient periods with and without turn-on control
Figure 3:
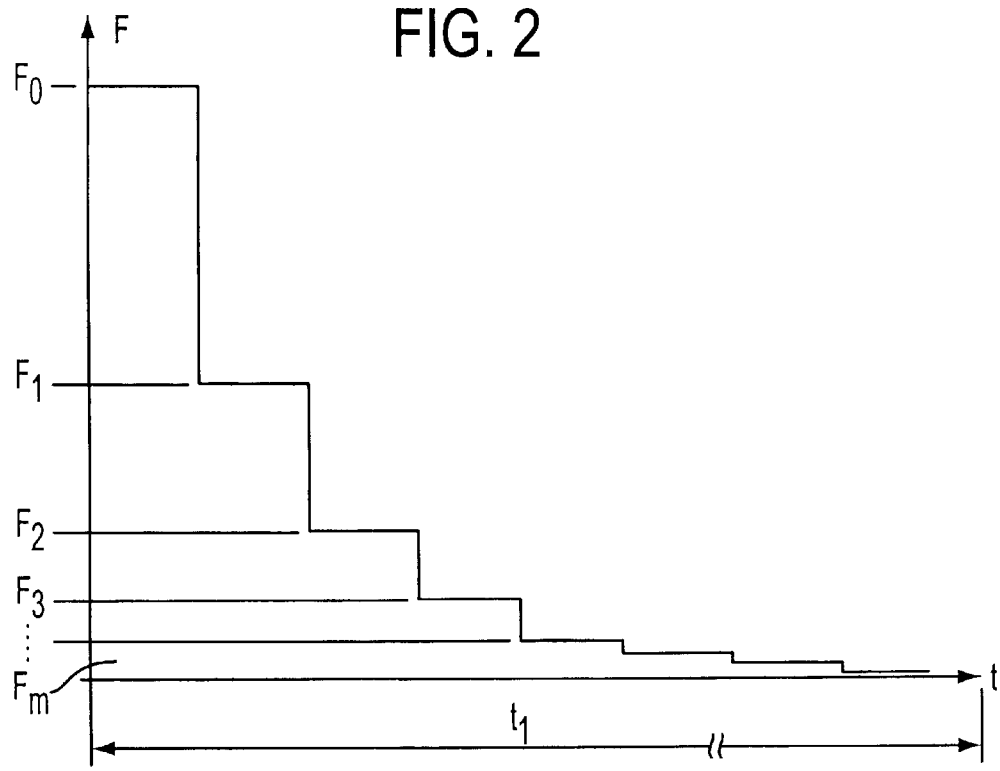

FIG. 2 shows how this causes an accelerated offset control process to occur, by means of which turn-on deviations will be settled more quickly. The course of graph 22 illustrates the standard turn-on characteristics. Here, a time period $t_2$ is required until the offset voltage $U_{off}$ has been compensated by the system, and the system with the reference voltage $U_{bez}$, e.g. $U_{bez}=2.5$ V is ready to operate. Graph 23 shows the accelerated course $t_1$ which is achieved by means of the specified embodiment. The system will be ready to operate significantly more quickly. As shown in FIG. 3, the frequency will be controlled such that it is reduced in stages down to the actual operating frequency range during the turn-on process. This is done by means of a shift register 10, which divides the turn-on frequency at the start into m steps, e.g. by the factor 2. These values will be passed on to the frequency-generating component via an m-bit data line. The m different turn-on frequencies can be generated by means of an additional oscillator 9 or the drive of the first oscillator 6. Here, the required lower limit frequency and the maximum permissible transient period will determine the number of steps in shift register 10. Using this frequency sequence, the counter range 15 of the forward/backward counter 7 will then again be decreased or increased by one value, depending on the sign 13. Immediately following this transient period (e.g. 0.3 s), the system will be ready to operate and can detect significant changes in the acceleration transducer 1 at any time in order to then trigger reliably the relevant safety devices.

The jumps from one high frequency to the next, up to the operating frequency or the operating frequency range, are now no longer as large, so that significant changes in acceleration during transient build-ups no longer lead to negative effects in the form of so-called offset jumps.

The operating mode of the drive process described here consists in that, after signal processing 3 in an operating condition, i.e., if no crash event has occurred, the output signal can be controlled by the offset control unit 11 such that it reaches a defined rest level.

What is claimed is:

1. A process for driving a sensor with offset control where the output signal of a drive circuit is compared to a reference voltage by a comparator, and where this comparison is effected at a fixed variable operating frequency, wherein
    a sensor voltage is generated,
    a measuring voltage is taken off the output of the drive circuit, which measuring voltage is composed of the sensor voltage, a system reference voltage, and an offset voltage, and
    the sign and the value of the difference between the measuring voltage at the drive output and a further reference voltage is detected, with the measuring voltage and the value of the difference determining the operating frequency, and the clocking frequency of a forward/backward counter and the sign of the difference value determining the counter advance sense, that is, the sign of an offset control quantity for the drive circuit.

2. A process for driving a sensor with offset control according to patent claim 1 wherein the sensor voltage is generated by a piezoresistive acceleration transducer.

3. A process for driving a sensor with offset control according to patent claim 1 wherein
    the value of the difference is used as an input quantity for an oscillator which generates a signal in relation to this value, and
    the clock frequency of the forward/backward counter is controlled by this signal.

4. A process for driving a sensor with offset control according to patent claim 3 wherein
    the counter advance direction of the forward/backward counter is controlled using the sign of the difference value.

5. A process for driving a sensor with offset control according to patent claim 4 wherein
    the digital output signal of the forward/backward counter is fed into a digital/analog converter where it is converted into an analog signal, and wherein
    the analog signal is fed into an amplifier arrangement of the drive circuit for the sensor signal.

6. A process for driving a sensor with offset control according to patent claim 5 wherein
    in the amplifier arrangement, the signal from the analog/digital converter is superposed on the offset voltage, and the deviation from the measuring voltage and system reference voltage is counteracted by the signal from the analog/digital converter.

7. A process for driving a sensor with offset control according to patent claim 6 wherein this offset control is repeated as often as required in order to achieve, in an operationally ready condition, an agreement between measuring voltage and system reference voltage.

8. A process for driving a sensor with offset control where the output signal of a drive circuit is compared to a reference voltage by a comparator, and where this comparison is effected at a fixed or variable operating frequency, wherein during turn-on, the comparison between the output signal and the reference voltage is effected by a comparator with a turn-on frequency having a higher frequency value than the normal operating frequency, and wherein during turn-on, the turn-on frequency is reduced in stages until the normal operating frequency is reached.

9. A process for driving a sensor with offset control according to patent claim 8 wherein the stages are generated by a shift register whose output controls a time pulse generator.

* * * * *